United States Patent
Koyama

(10) Patent No.: US 9,703,284 B2
(45) Date of Patent: Jul. 11, 2017

(54) GROUP MANAGEMENT SYSTEM AND RECORDING MEDIUM

(71) Applicant: TOKYO ELECTRON LIMITED, Tokyo (JP)

(72) Inventor: Noriaki Koyama, Oshu (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 462 days.

(21) Appl. No.: 14/454,752

(22) Filed: Aug. 8, 2014

(65) Prior Publication Data

US 2015/0045942 A1 Feb. 12, 2015

(30) Foreign Application Priority Data

Aug. 12, 2013 (JP) .................... 2013-167371

(51) Int. Cl.
*G05B 19/418* (2006.01)
*H04L 29/08* (2006.01)

(52) U.S. Cl.
CPC ........ *G05B 19/4185* (2013.01); *H04L 67/125* (2013.01); *H04L 67/36* (2013.01);
(Continued)

(58) Field of Classification Search
None
See application file for complete search history.

(56) References Cited

U.S. PATENT DOCUMENTS

| | | | | |
|---|---|---|---|---|
| 7,225,046 B2* | 5/2007 | Saito | ............... | G05B 19/41865 700/121 |
| 7,333,876 B2* | 2/2008 | Knight, Jr. | ......... | G05B 23/0216 118/663 |

(Continued)

FOREIGN PATENT DOCUMENTS

| | | |
|---|---|---|
| JP | 11-354395 A | 12/1999 |
| JP | 2011-071166 A | 4/2011 |

(Continued)

OTHER PUBLICATIONS

US 8,423,169, 04/2013, Asai et al. (withdrawn)

*Primary Examiner* — Tuan Dao
(74) *Attorney, Agent, or Firm* — Nath, Goldberg & Meyer; Jerald L. Meyer

(57) ABSTRACT

There is provided a group management system including one or more manufacturing devices and one or more server devices. Each of the manufacturing devices includes a manufacturing device display unit configured to display information on the specified process, an acquiring unit configured to acquire information of respective parts of each of the manufacturing devices and an acquired information transmitting unit configured to transmit the acquired information to the server devices. Each of the server devices includes a storage unit configured to store the information transmitted from the acquired information transmitting unit, an analysis unit configured to analyze the stored information and a server device display unit configured to display the stored information and the analyzed information. Each of the manufacturing devices further includes a remote operation function unit configured to directly operate the server device display unit from the manufacturing device display unit.

5 Claims, 7 Drawing Sheets

(52) U.S. Cl.
CPC ............ *G05B 2219/31208* (2013.01); *G05B 2219/31443* (2013.01); *Y02P 90/18* (2015.11)

(56) References Cited

U.S. PATENT DOCUMENTS

| | | |
|---|---|---|
| 7,813,828 B2 | 10/2010 | Asai et al. |
| 8,271,119 B2 | 9/2012 | Nakagawa |
| 8,447,424 B2 | 5/2013 | Asai et al. |
| 8,768,502 B2 | 7/2014 | Nakagawa |
| 2004/0033639 A1* | 2/2004 | Chinn .................. B81B 3/0005 438/59 |
| 2005/0136684 A1* | 6/2005 | Mukai .................. C23C 16/045 438/778 |
| 2007/0186144 A1 | 8/2007 | Stange et al. |
| 2009/0159576 A1* | 6/2009 | Sommerfeld ............ B23K 9/32 219/121.54 |
| 2013/0204417 A1* | 8/2013 | Matsumaru ............ B23B 25/06 700/95 |

FOREIGN PATENT DOCUMENTS

| | | |
|---|---|---|
| KR | 10-0561154 B1 | 3/2006 |
| KR | 10-2009-0004423 A | 1/2009 |

\* cited by examiner

GROUP MANAGEMENT SYSTEM AND RECORDING MEDIUM

CROSS-REFERENCE TO RELATED APPLICATION

This application claims the benefit of Japanese Patent Application No. 2013-167371, filed on Aug. 12, 2013, in the Japan Patent Office, the disclosure of which is incorporated herein in its entirety by reference.

TECHNICAL FIELD

The present disclosure relates to a group management system and a recording medium.

BACKGROUND

A group management system includes one or more manufacturing devices that perform a specified semiconductor process with respect to a workpiece and one or more server devices that are connected to the manufacturing devices. The group management system is a system that manages a manufacturing device such as a semiconductor manufacturing device or a liquid crystal panel manufacturing device. Various proposals for efficiently managing the manufacturing devices have been introduced. For example, there is proposed a group management system in which, after an abnormality is detected from an inspection target group (a time period, a device group, a recipe group and/or a parameter group) set by a user, the overall inspection data of the inspection target group are taken into the group management system so that a user can analyze the abnormality.

In the group management system, there may be a case that, during a work performed by a user, such as maintenance and repair, trouble and process evaluations of a manufacturing device and the like, the user may attempt to refer to or copy the data of a plurality of manufacturing devices. However, in such cases, as a security protocol, it is necessary for the user to go to a manufacturing device for referring to the data, and to check necessary data on a screen of the manufacturing device. If the manufacturing device that the user was referring to is in use, the necessary data may not be checked on the screen. Furthermore, since the screen may be in use even during a downtime, due to various kinds of analysis works, parameter settings and the like, it may not enhance the work efficiency. That is, a problem is posed in that the user's work efficiency becomes poor even if the downtime of a manufacturing device grows longer.

In this case, the user's work can be made efficient by installing a function capable of referring to and copying data to a manufacturing device. However, a high-load process such as a data analysis or the like has to be implemented in the manufacturing device. This may adversely affect the control performance of the manufacturing device. Thus, there is a fear that a process result gets worse. In addition, a security protection against virus and so forth is needed. On the other hand, if the function is independently installed, there is posed a problem in that the number of development processes grows larger and repetitive repair may become necessary.

SUMMARY

Some embodiments of the present disclosure provide a group management system and a recording medium capable of shortening a downtime of a manufacturing device. Furthermore, some embodiments of the present disclosure provide a group management system and a recording medium capable of making a user's work efficient.

According to one embodiment of the present disclosure, there is provided a group management system, including: one or more manufacturing devices configured to perform a specified process with respect to a workpiece; and one or more server devices connected to the manufacturing devices, wherein each of the manufacturing devices includes: a manufacturing device display unit configured to display information on the specified process; an acquiring unit configured to acquire information including temperatures, pressures, flow rates and electric powers of respective parts of each of the manufacturing devices; and an acquired information transmitting unit configured to transmit the information acquired by the acquiring unit to the server devices, and wherein each of the server devices includes: a storage unit configured to store the information transmitted from the acquired information transmitting unit; an analysis unit configured to analyze the information stored in the storage unit; and a server device display unit configured to display the information stored in the storage unit and information analyzed in the analysis unit, each of the manufacturing devices further including a remote operation function unit configured to directly operate the server device display unit from the manufacturing device display unit.

According to another embodiment of the present disclosure, there is provided a non-transitory computer-readable recording medium storing a program that cause a computer to perform a process for serving as a group management system comprising one or more manufacturing devices configured to perform a specified process with respect to a workpiece and one or more server devices connected to the manufacturing devices, the program configured to enable the computer to cause each of the manufacturing devices to serve as a manufacturing device display unit configured to display information on the specified process, an acquiring unit configured to acquire information including temperatures, pressures, flow rates and electric powers of respective parts of each of the manufacturing devices, and an acquired information transmitting unit configured to transmit the information acquired by the acquiring unit to the server devices, the program configured to enable the computer to cause each of the server devices to serve as a storage unit configured to store the information transmitted from the acquired information transmitting unit, an analysis unit configured to analyze the information stored in the storage unit, and a server device display unit configured to display the information stored in the storage unit and the information analyzed in the analysis unit, and the program configured to enable the computer to cause each of the manufacturing devices to serve as a remote operation function unit configured to directly operate the server device display unit from the manufacturing device display unit.

BRIEF DESCRIPTION OF THE DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

Figure 1:
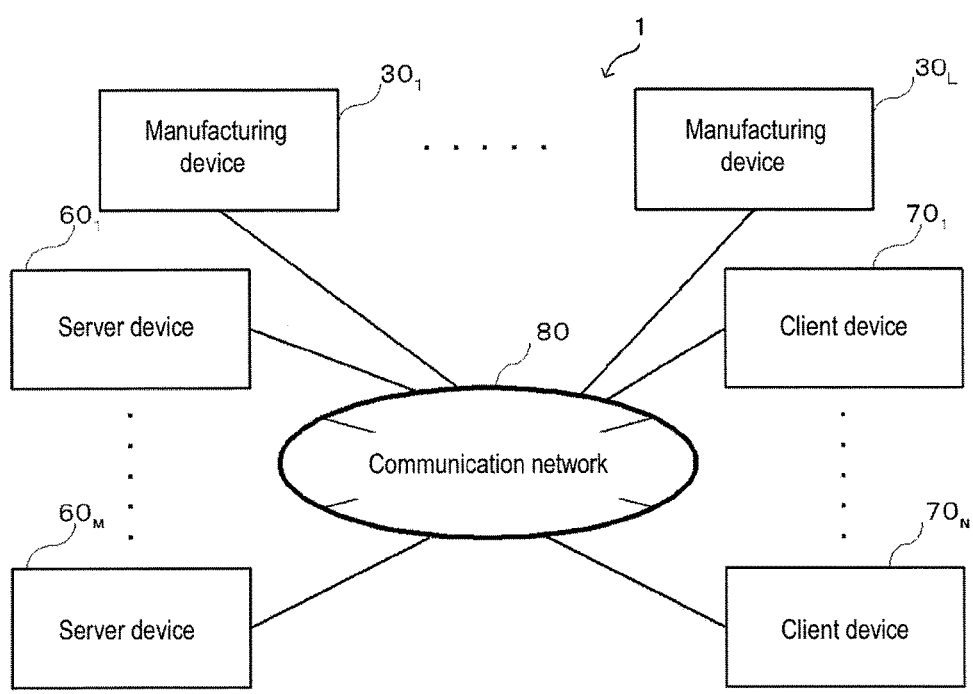
FIG. 1 is a block diagram showing a configuration of a group management system according to one embodiment of the present disclosure.

A group management system and a recording medium according to the present disclosure will now be described with reference to the drawings. The group management system according to the present disclosure includes one or more manufacturing devices configured to perform a specified semiconductor process with respect to a workpiece, and one or more server devices connected to the manufacturing devices. FIG. 1 is a block diagram showing one example of a configuration of a group management system according to the present embodiment. In the present embodiment, description will be made on only the characteristic parts of a group management system 1.

As shown in FIG. 1, the group management system 1 of the present embodiment includes L manufacturing devices $30_1$~$30_L$, M server devices $60_1$~$60_M$ and N client devices $70_1$~$70_N$. In the present embodiment, L, M and N are an integer equal to or greater than 1. The L manufacturing devices $30_1$~$30_L$, the M server devices $60_1$~$60_M$ and the N client devices $70_1$~$70_N$ are connected through a wired or wireless communication network 80 so that they can communicate with one another. The communication network may include, for example, an Internet, an intranet, a public telephone network or the like.

The manufacturing devices $30_1$~$30_L$ are devices that perform specified semiconductor processes with respect to a workpiece. The manufacturing device $30_1$~$30_L$, may include, for example, a semiconductor manufacturing device, a liquid crystal panel manufacturing device, an organic EL (Electroluminescence) display manufacturing device, a plasma display panel manufacturing device and the like. The workpiece may include, e.g., a semiconductor wafer, a FPD (Flat Panel Display) substrate or the like. The FPD substrate may be, e.g., a glass substrate. Specified semiconductor processes performed by the manufacturing devices $30_1$~$30_L$ may include a pre-processing process or a post-processing process of a semiconductor process as long as the specified semiconductor processes include at least a process on a semiconductor. The specified semiconductor processes may include, for example, a film forming process, an etching process, a thermal oxidation process and the like.

Figure 2:
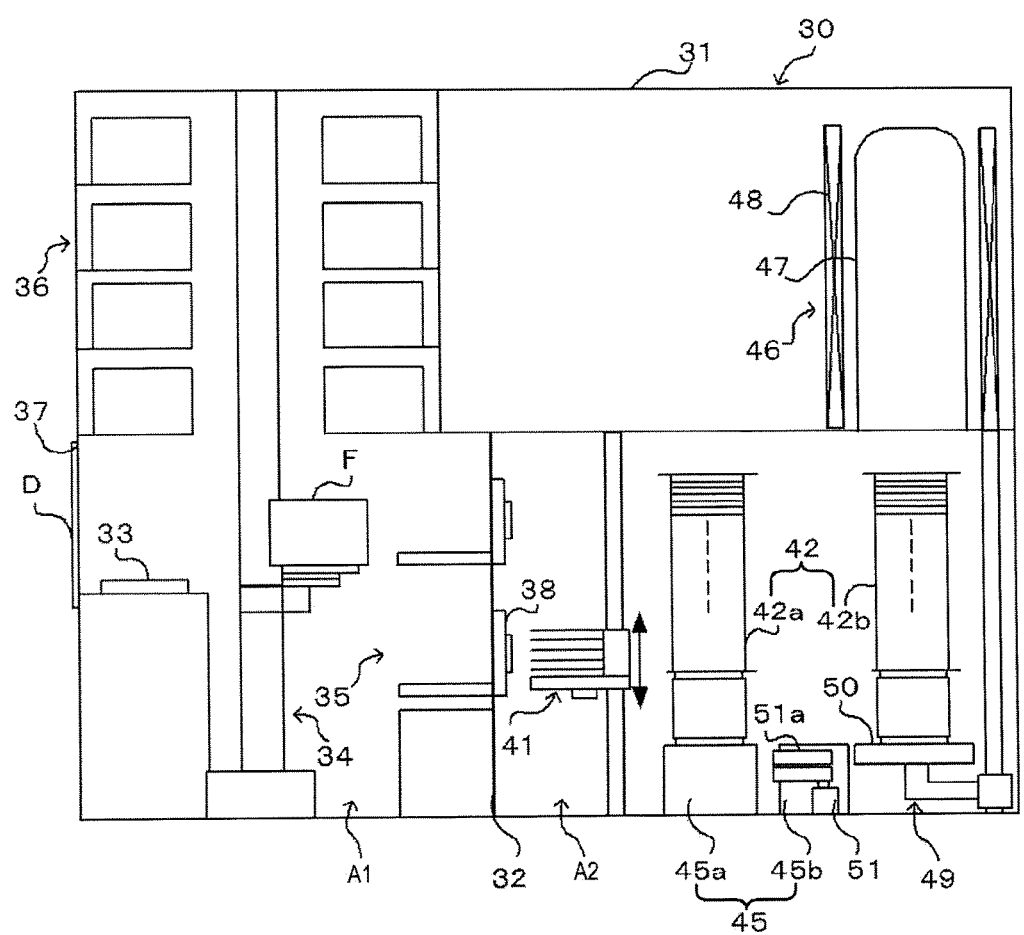
FIG. 2 is a view showing one example of a manufacturing device shown in FIG. 1.

The manufacturing device 30 is, e.g., a batch-type vertical heat treatment device. FIG. 2 shows one example of the manufacturing device 30. As shown in FIG. 2, the manufacturing device 30 includes a processing chamber 31 which is partitioned into a work area A1 and a loading area A2 by a partition wall 32. The work area A1 is an area for transferring a Front Opening Unified Pod (FOUP) F, which is a sealed transfer container accommodating a plurality of, e.g., 25, semiconductor wafers W, and storing the FOUP F. For example, the work area A1 is maintained in an atmospheric environment. On the other hand, the loading area A2 is an area for performing heat treatment, e.g., a film forming process or an oxidizing process, on the semiconductor wafers W. The loading area A2 is maintained in an atmosphere of an inert gas, e.g., a nitrogen gas ($N_2$).

In the work area A1, there are installed a load port 33, a FOUP conveyor 34, a transfer stage 35 and a storage unit 36.

The load port 33 holds the FOUP F, which is carried into the processing chamber 31 from a transfer gate 37 installed at a lateral position of the processing chamber 31 by an external transfer mechanism not shown. For example, a door D is installed at an outer side of the processing chamber 31, which is a position corresponding to the transfer gate 37. The transfer gate 37 can be opened and closed by the door D.

The FOUP conveyor 34 is installed between the load port 33 and the transfer stage 35, and conveys the FOUP F in the work area A1. The FOUP conveyor 34 conveys the FOUP F loaded on the load port 33 to the storage unit 36 installed at the upper side within the work area A1 and conveys the FOUP F stored in the storage unit 36 to the transfer stage 35.

The transfer stage 35 is installed at a side of the work area A1 of the partition wall 32 and holds the FOUP F conveyed by the FOUP conveyor 34. Further, in the transfer stage 35, the semiconductor wafers W are unloaded from the inside of the loaded FOUP F into the loading area A2 by a delivery mechanism 41. The partition wall 32 has an opening at a side position of the transfer stage 35. A shutter 38 is installed on the partition wall 32 at the side of the loading area A2 so as to close this opening.

Within the loading area A2, there are installed a delivery mechanism 41, boat mounting tables 45 (45a and 45b) and a boat delivery mechanism S1.

The delivery mechanism 41 is installed between the shutter 38 and the boat mounting table 45a. The delivery mechanism 41 delivers the semiconductor wafers W between the FOUP F loaded on the transfer stage 35 and the wafer boat 42 loaded on the boat mounting table 45a.

The boat mounting tables 45a and 45b are tables on which the wafer boats are mounted. Two boat mounting tables, e.g., a moving-boat mounting table 45a on which a wafer boat 42 for delivering the semiconductor wafers W by the delivery mechanism 41 is mounted, and a standby boat mounting table 45b that holds a standby wafer boat 42, are provided. The wafer boat 42 includes a plurality of, e.g., two, wafer boats 42a and 42b which are alternately used.

A heat treatment furnace 46 includes a quartz-made cylindrical processing vessel 47 of a shape with an opening provided at a bottom portion of the quartz-made cylindrical processing vessel 47 and properly roofed. A cylindrical heater 48 is installed around the processing vessel 47 and is configured to heat the semiconductor wafers W within the processing vessel 47. A cap 50 that can be moved up and down by an elevator mechanism 49 is arranged below the processing vessel 47. The semiconductor wafers W are accommodated into the wafer boat 42, which is held on the cap 50 and is moved upwardly, so that the semiconductor wafers W are loaded into the processing vessel 47. Through this loading operation, the opening at the bottom portion of the processing vessel 47 is hermetically sealed by the cap 50.

The boat delivery mechanism 51 is installed in the vicinity of the boat mounting tables 45a and 45b. The boat delivery mechanism 51 includes an arm 51a that is made to advance and retreat. The boat delivery mechanism 51 delivers the wafer boat 42 between the boat mounting tables 45a and 45b and the cap 50.

Figure 3:
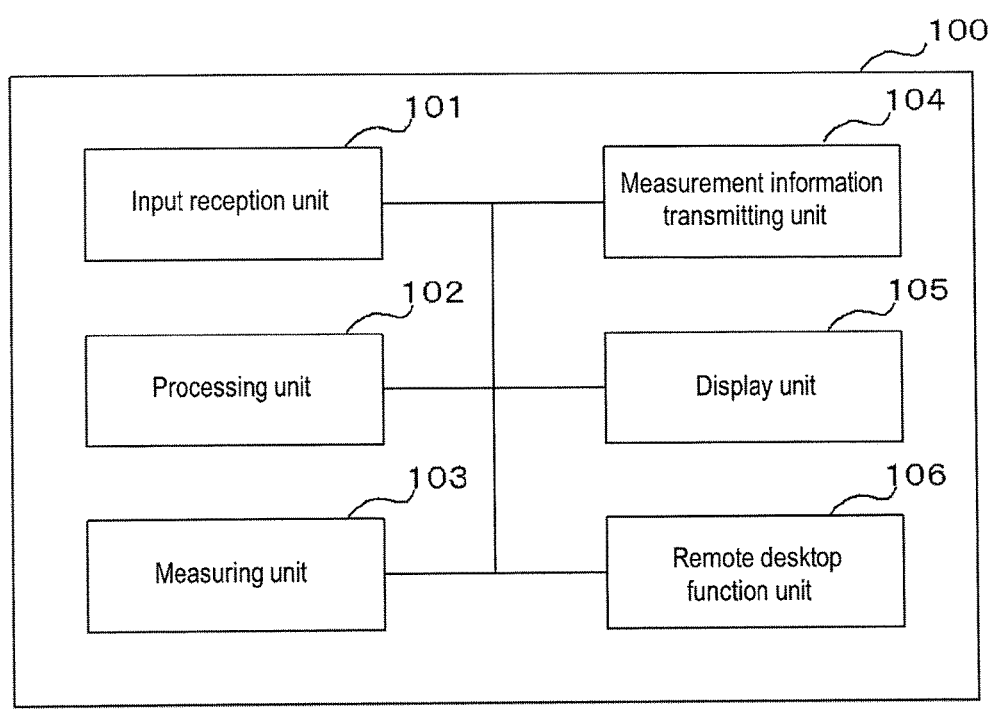
FIG. 3 is a view showing a configuration of a control unit.

The manufacturing device 30 includes a control unit 100 that controls the respective parts of the manufacturing device 30. FIG. 3 shows a configuration of the control unit 100. As shown in FIG. 3, the control unit 100 includes an input reception unit 101, a processing unit 102, a measuring unit 103, a measurement information transmitting unit 104, a display unit 105 and a remote desktop function unit 106.

The input reception unit 101 receives various kinds of inputs from a user. The input reception unit 101 is composed of an input means, such as a ten key or a keyboard, menu screen control software and the like. The various kinds of inputs received from the user may include, for example, a recipe, a recipe identifier for identifying a recipe, and an execution instruction of a process such as a wafer processing process.

The processing unit 102 reads out a recipe of the manufacturing device 30, which is stored in the server device 60, and performs a specified process with respect to a workpiece according to the recipe. That is to say, the processing unit 102 causes the measuring unit 103 to measure temperatures, pressures, flow rates and the like of the respective parts of the manufacturing device 30 and controls the respective parts of the manufacturing device 30 to follow the recipe based on the measurement data.

The measuring unit 103 measures the temperatures, pressures, flow rates and electric powers of the respective parts of the manufacturing device 30. The measuring unit 103 acquires measured values from one or more sensors such as temperature sensors, pressure sensors and flow rate sensors. Moreover, the measuring unit 103 may perform a specified operation with respect to the measured values. The specified operation may include, for example, calculating an average value of a plurality of values at a specified time interval, acquiring a maximum value, acquiring a minimum value, normalizing the measured values, calculating a standard deviation and acquiring a median value.

The measurement information transmitting unit 104 transmits information such as temperatures, pressures, flow rates and electric powers measured by the measuring unit 103 to the server device 60.

The display unit 105 presents various kinds of information to a user of the manufacturing device 30. The display unit 105 is composed of, e.g., a liquid crystal display, an organic EL display or the like. When the input reception unit 101 is composed of control software of a menu screen, the input reception unit 101 serves as the display unit 105.

The remote desktop function unit 106 directly operates a display screen of the server device 60 on the display unit 105 (display screen) of the manufacturing device 30. The reference and copy of the data stored in the server device 60 is performed by the remote desktop function unit 106. The remote desktop function unit 106 can be executed by, e.g., a manufacturing device program.

The server devices 60 (60$_1$ to 60$_M$) are server devices that constitute a so-called group management system. The server devices 60 receive and store various kinds of information transmitted from one or more manufacturing devices 30, e.g., process-related information (a recipe or the like) on a semiconductor process or measurement information. In addition, the server devices 60 perform processes according to requests from the client devices 70 or the manufacturing devices 30 and appropriately transmit the process results to the client devices 70 or the manufacturing devices 30.

Figure 4:
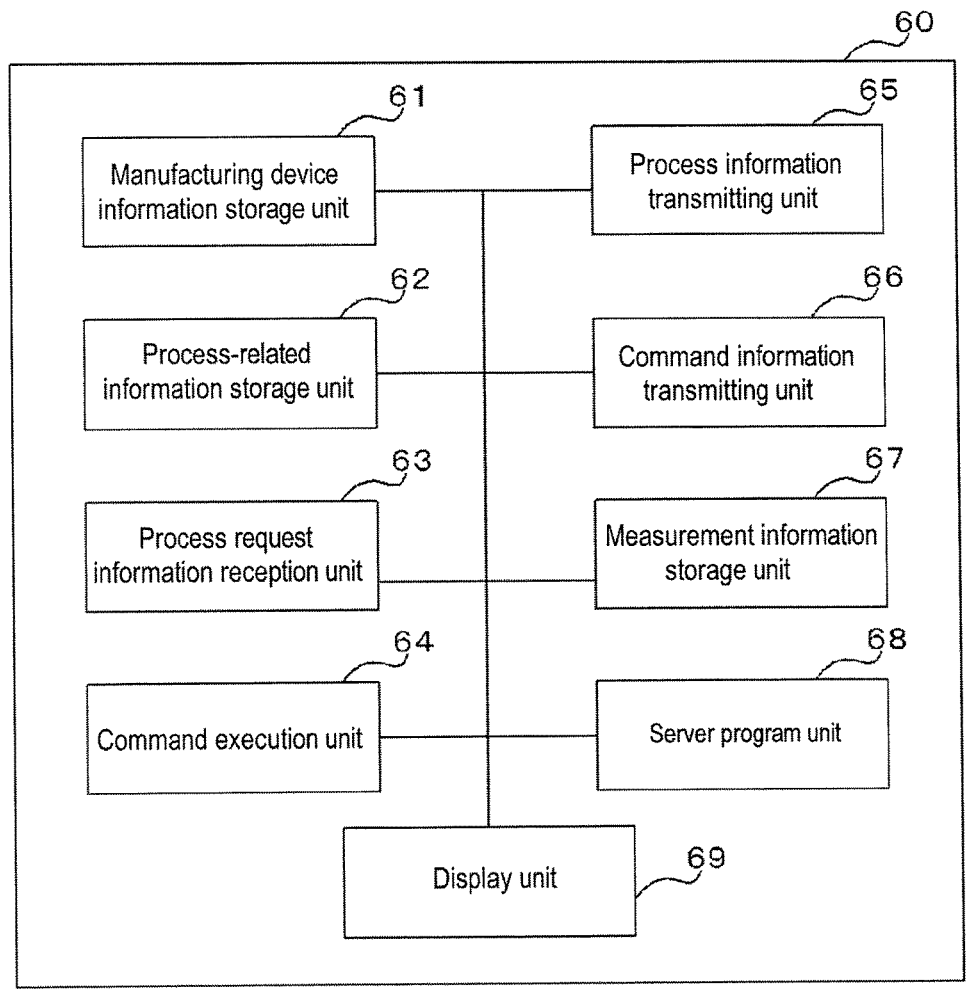
FIG. 4 is a view showing a configuration of a server device shown in FIG. 1.

FIG. 4 shows a configuration of the server device 60. As shown in FIG. 4, the server device 60 includes a manufacturing device information storage unit 61, a process-related information storage unit 62, a process request information reception unit 63, a command execution unit 64, a process information transmitting unit 65, a command information transmitting unit 66, a measurement information storage unit 67, a server program unit 68 and a display unit 69. In the present embodiment, only the characteristic parts of the group management system 1 will be specifically described with the remaining parts omitted from description.

The manufacturing device information storage unit 61 stores the manufacturing device information on the manufacturing device 30, which is connected to the server device 60 through the communication network 80. The manufacturing device information storage unit 61 is composed of a recording medium such as a hard disk, a ROM (Read Only Memory), a RAM (Random Access Memory) or the like. The manufacturing device information may include, for example, identification information of the manufacturing device 30 and so forth. Moreover, the manufacturing device information storage unit 61 stores a semiconductor process that can be used by the manufacturing device 30.

The process-related information storage unit 62 stores the process-related information on a semiconductor process such as recipes or processing parameters, which may be used in the manufacturing device 30 connected through the communication network 80. The process-related information storage unit 62 stores one or more kinds of process-related information. The recipes are information used in determining, e.g., conditions of a semiconductor process (e.g., the process time, the kind of a process gas, etc.). The parameters are the information that indicates, e.g., the numerical values required for the operation of the manufacturing device 30 (e.g., the numerical values indicative of an upper limit and a lower limit of a preset temperature).

The storage in the process-related information storage unit 62 may be either a temporary storage in a RAM or the like, or a long-term storage. The process-related information storage unit 62 can be executed by a specified storage medium (e.g., a semiconductor memory, a magnetic disk, an optical disk, etc.). The process-related information is stored in the process-related information storage unit 62 in the following manner. For example, the process-related information may be stored in the process-related information storage unit 62 through a recording medium. The process-related information transmitted through the communication network 80 or the like may be stored in the process-related information storage unit 62. The process-related information inputted through an input device may be stored in the process-related information storage unit 62.

The process request information reception unit 63 receives the process request information that requests a desired process on the process-related information. The process request information reception unit 63 may receive, e.g., process request information inputted from an input device (e.g., a keyboard, a mouse or a touch panel), process request information transmitted through a wired or wireless communication line, or process request information read out from a specified recording medium (e.g., an optical disk, a magnetic disk or a semiconductor memory).

The command execution unit 64 generates command information for instructing the manufacturing device 30 according to the received process request information and transmits the command information to the corresponding manufacturing device 30. More specifically, the command execution unit 64 generates command information corresponding to a command included in the process request information received by the process request information reception unit 63. Then, the command execution unit 64 allows the command information transmitting unit 66, which will be described later, to transmit the generated command information to the manufacturing device 30, which is identified in the process request information received by the process request information reception unit 63.

In this regard, the command included in the command information includes the process request information received by the process request information reception unit 63 and may be executed by the manufacturing device 30. For example, the command execution unit 64 may have a recipe on the process to be included in the command information. The command execution unit 64 can be a memory or the like. A process sequence of the command execution unit 64 can also be software which is recorded in a recording medium such as a HDD (Hard Disk Drive) or a ROM. Alternatively, the process sequence of the command execution unit 64 may be hardware (a dedicated circuit).

The process information transmitting unit 65 transmits information on a process, which may be executed in the manufacturing device 30 in response to an instruction sent from the server device 60, to the client device 70. The process information transmitting unit 65 transmits the information (application) on a process to be processed by the manufacturing device 30.

The command information transmitting unit 66 transmits the command information, which has been generated by the command execution unit 64 based on the process request information received by the process request information reception unit 63, to the manufacturing device 30. When transmission information for a plurality of the manufacturing devices 30 is received, the command information transmitting unit 66 transmits command information to the plurality of transmitters.

The measurement information storage unit 67 stores information on a plurality of measurements. The information on the plurality of measurements includes, e.g., time-series information on one or more measurements, which have been measured in the manufacturing device 30 (e.g., a temperature and a pressure), and information regarding measured values for a specified process that is performed in the manufacturing device 30 and time information indicative of a measuring time. Further, the information on the plurality of measurements may include a manufacturing device identifier for identifying the manufacturing device 30, a recipe identifier, a recipe step identifier, and so forth. The measurement information storage unit 67 is composed of e.g., a recording medium such as a hard disk, a ROM or a RAM.

In the measurement information storage unit 67, a data analysis is carried out based on the stored measurement information. The data analysis may include, for example, an execution of specified operations for calculating an average of a plurality of values at a specified time interval, acquiring a maximum value, acquiring a minimum value, normalizing measured values, calculating standard deviations and acquiring a median value.

The server program unit 68 is a program executed in the server device 60. The server program unit 68 executes, e.g., a terminal service function. In the present embodiment, the manufacturing device 30 cooperates with the terminal service function of the server program unit 68 via the remote desktop function unit 106 to thereby perform reference or copy of the information (data) stored in the measurement information storage unit 67.

The display unit 69 presents various kinds of information to the server device 60. The display unit 69 is composed of, e.g., a liquid crystal display or an organic EL display.

The client device 70 requests the server device 60 or the manufacturing device 30 to perform various kinds of processes. Furthermore, the client device 70 receives the process results for the process requests.

Figure 5:
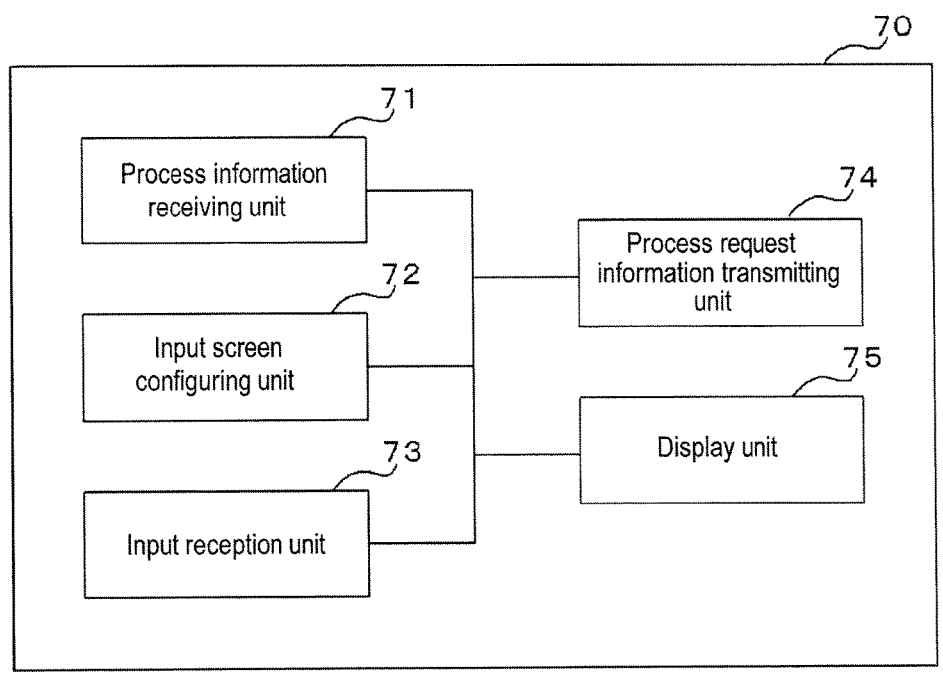
FIG. 5 is a view showing a configuration of a client device shown in FIG. 1.

FIG. 5 shows a configuration of the client device 70. As shown in FIG. 5, the client device 70 includes a process information receiving unit 71, an input screen configuring unit 72, an input reception unit 73, a process request information transmitting unit 74 and a display unit 75. In the present embodiment, it will be described on the characteristic parts of the group management system 1 with descriptions of other parts omitted like the preceding descriptions on the server device 60.

The process information receiving unit 71 specifies the server device 60 connected to the client device 70 and receives the process information transmitted from the connected server device 60 (the process information transmitting unit 65).

The input screen configuring unit 72 configures an input screen for the client device 70. The input screen configuring unit 72 includes an image information file that stores information such as images to be displayed during a process. The input screen configuring unit 72 stores images of various materials and various kinds of forms for generating the images. The input screen configuring unit 72 configures an input screen for the client device 70 based on the process information received by the process information receiving unit 71 and the images (input screens) stored in an image information database.

The input reception unit 73 receives an input of a user who operates the client device 70. The input reception unit 73 may receive, e.g., information inputted from an input device (e.g., a keyboard, a mouse or a touch panel), information transmitted through a wired or wireless communication line, or information read out from a specified recording medium (e.g., an optical disk, a magnetic disk or a semiconductor memory).

The process request information transmitting unit 74 transmits the process request information received by the input reception unit 73 to the server device 60. The process request information transmitting unit 74 may include a transmitting device for performing transmission (e.g., a modem or a network card).

The display unit 75 displays various kinds of images, e.g., an input screen for the client device 70 configured by the input screen configuring unit 72. The display unit 75 may include a display device (e.g., a cathode ray tube or a liquid crystal display) for displaying the images. The display unit 75 may be executed by hardware or may be executed by software such as a driver for driving a display device.

Figure 6:
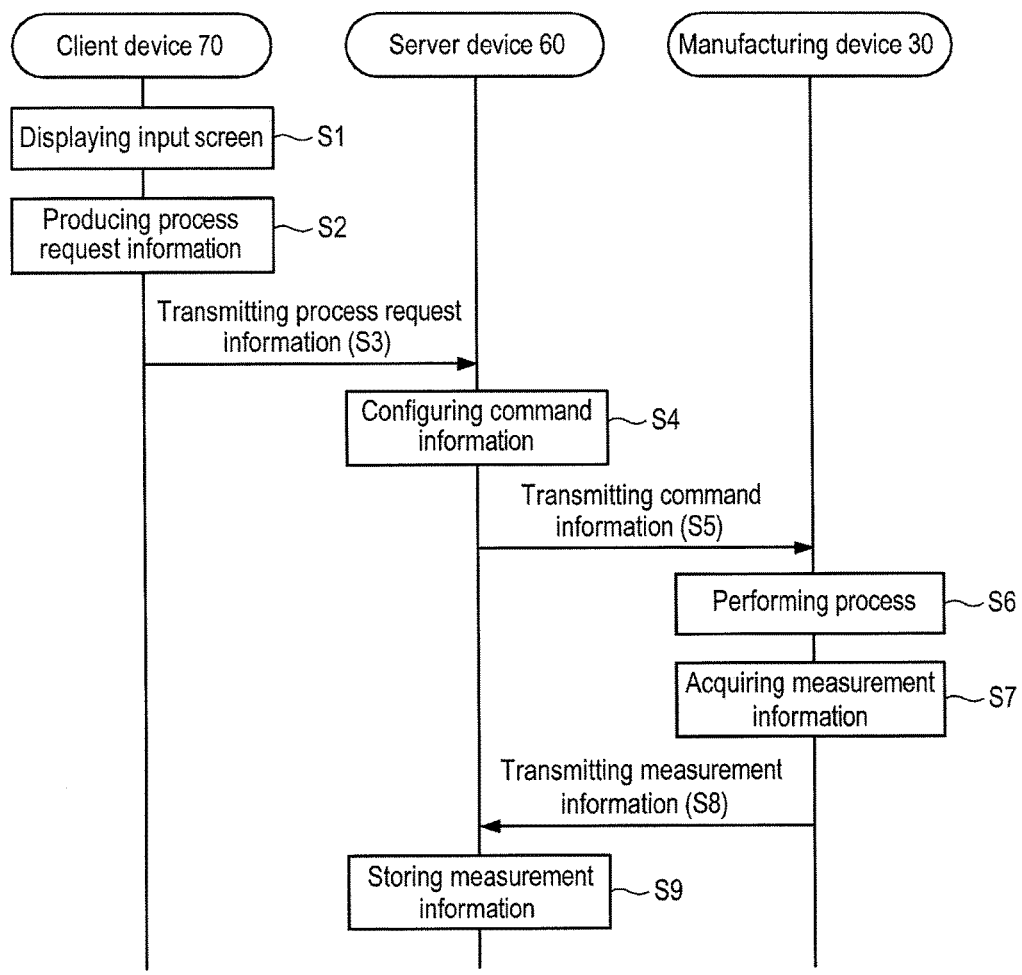
FIG. 6 is a flowchart for explaining the operation of the group management system.
Figure 7:
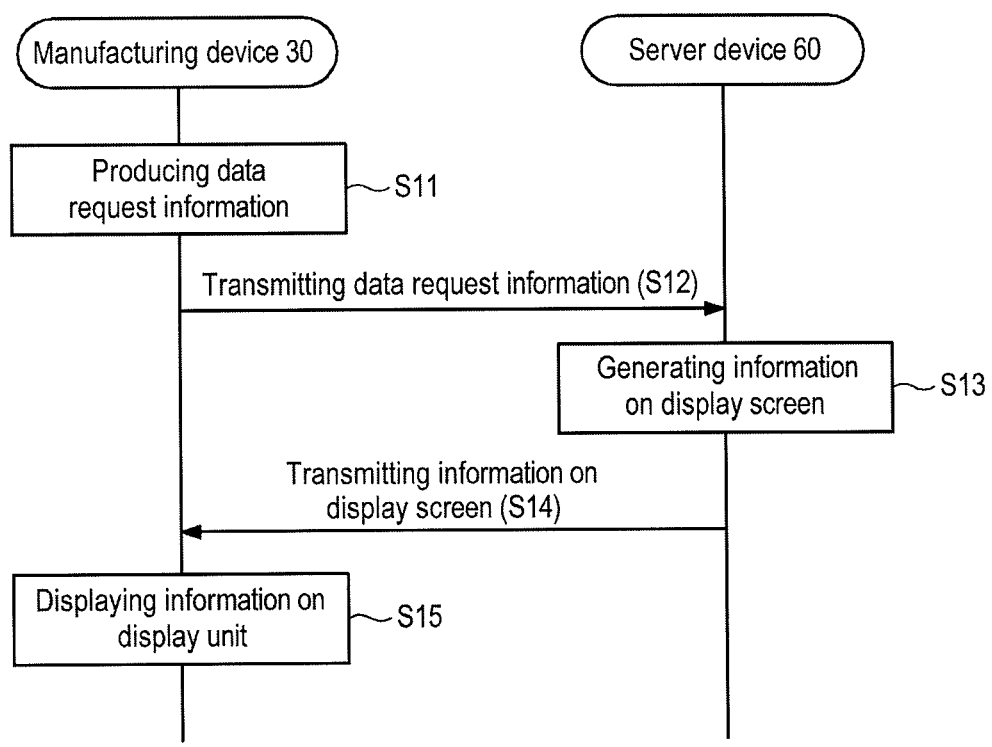
FIG. 7 is a flowchart for explaining the operation of the group management system.

Next, description will be made on an operation of the group management system 1 configured as above. FIGS. 6 and 7 are flowcharts for explaining the operation of the group management system 1.

First, a user boots up the client device 70 and operates, e.g., the input reception unit 73 to select an icon displayed on a desktop of the display unit 75. Thus, as shown in FIG. 6, an input screen for the client device 70 is displayed on the display unit 75 (Step S1). Then, the user operates the input reception unit 73 to input desired process contents to the input screen for the client device 70, thereby producing process request information (Step S2). And then, the produced process request information is transmitted to the corresponding server device 60 through the communication network 80 (Step S3).

If the process request information is transmitted to the server device 60, then the process request information reception unit 63 receives the process request information. And, according to the received process request information, the command execution unit 64 generates command information to be commanded to the manufacturing device 30 (Step S4). The command execution unit 64 includes a recipe on the process in the command information. Then, the command information transmitting unit 66 transmits the command information generated by the command execution unit 64 to the corresponding manufacturing device 30 through the communication network 80 (Step S5).

In the manufacturing device 30, if the input reception unit 101 receives the transmitted command information, the processing unit 102 performs a specified process on a workpiece according to the transmitted recipe (Step S6). More specifically, the processing unit 102 causes the measuring unit 103 to measure temperatures, pressures and flow rates of the respective parts of the manufacturing device 30. Based on the measured data, the processing unit 102 controls the respective parts of the manufacturing device 30 such that the respective parts follow the recipe. If a process is performed, the measurement information transmitting unit 104 acquires measurement information such as the temperatures, pressures, flow rates and electric powers measured by the measuring unit 103 (Step S7) and transmits the acquired measurement information to the server device 60 (Step S8). Thus, information on a plurality of measurements is stored in the measurement information storage unit 67 of the server device 60 (Step S9).

In this way, the measurement information is stored in the measurement information storage unit 67 of the server device 60. A data analysis process is performed in the measurement information storage unit 67. Moreover, process-related information on a semiconductor process, such as recipes, processing parameters and the like, which are used in the manufacturing device 30, is stored in the process-related information storage unit 62 of the server device 60. Thus, the manufacturing device 30 does not have to perform a high-load process, so that control performance of the manufacturing device 30 is not adversely affected.

In the group management system 1, the server program unit 68 of the server device 60 performs data transmission and reception with the manufacturing device program of the remote desktop function unit 106 in the manufacturing device 30 through the communication network 80. For example, as shown in FIG. 7, the user operates the display unit 105 of the manufacturing device 30 to produce data request information (Step S11) and transmits the produced data request information to the server program unit 68 of the server device 60 through the communication network 80 (Step S12). The server program unit 68 generates information on a display screen based on the received data request information (Step S13) and transmits the generated information on the display screen to the manufacturing device 30 (Step S14). As the server program unit 68 performs the data transmission and reception with the manufacturing device program of the remote desktop function unit 106 in the manufacturing device 30 through the communication network 80 in this way, the information on the display screen is displayed on the display unit 105 of the manufacturing device 30 (Step S15). As a result, it becomes possible to refer to and copy data by directly operating the display screen of the display unit 69 of the server device 60 through the display screen of the display unit 105 of the manufacturing device 30.

In this way, all the display screens displayed on the display unit 69 of the server device 60 can be operated through the display unit 105 of one manufacturing device 30. This makes it possible to refer to and copy data on the display screen of the display unit 105 of one manufacturing device 30. As a consequence, during a work such as maintenance and repair, a trouble, evaluation and the like of the manufacturing device 30, it is possible to easily compare the manufacturing devices 30 with one another. This makes it possible to improve the work efficiency.

Since it is not needed to install an OS (Operating System) on the manufacturing device 30, it becomes unnecessary to establish a security policy for virus or the like. Also, since double development is unnecessary, it is possible to reduce the maintenance costs and to shorten the delivery time. Furthermore, the operation of the display unit 105 of the manufacturing device 30 is not performed only by a keyboard or a mouse but can be performed with an optimal user interface such as a touch panel or the like. Since the information on the display screen is received by the remote desktop function unit 106 of the manufacturing device 30 and is displayed on the display unit 105, it is not needed to install dedicated software on the manufacturing device 30, thereby facilitating management.

According to the group management system 1 configured as above, data of a plurality of manufacturing devices 30 can be referred to or copied in one manufacturing device 30 so that the user can efficiently work and a downtime of the manufacturing device 30 can be shortened. Moreover, it is possible to make a user's work highly precise.

The present disclosure is not limited to the aforementioned embodiment but can be modified or applied in many different forms. Description will now be made on other embodiments applicable to the present disclosure.

In the aforementioned embodiment, the present disclosure has been described by taking, as an example, the case where the measurement information such as the temperatures, pressures, flow rates and electric powers measured by the measuring unit 103 is transmitted to the server device 60. However, the information transmitted to the server device 60 is not limited to the measured values but may be specified setting values.

In the aforementioned embodiment, the present disclosure has been described by taking, as an example, the case where data of a plurality of manufacturing devices 30 are referred to or copied by the remote desktop function unit 106 in one manufacturing device 30. However, the present disclosure is not limited thereto. It may be possible to use various remote operation functions.

In the aforementioned embodiment, the present disclosure has been described by taking, as an example, the case where the group management system 1 includes the manufacturing devices 30, the server devices 60 and the client devices 70. However, if the group management system 1 includes one or more manufacturing devices and one or more server devices connected to the manufacturing devices, the client devices 70 may not be included therein.

The configurations of the manufacturing devices 30, the server devices 60 and the client devices 70 of the group management system 1 are not limited to the configurations of the aforementioned embodiment but may further include components other than those described above. For example, in the aforementioned embodiment, if two or more components included in the server devices 60 or the manufacturing devices 30 have a communication device or an input device, the two or more components may be embodied in a physically single device or separate devices.

In the aforementioned embodiment, the respective processes or the respective functions may be executed through the concentrated processing performed by a single device or a single system or may be executed through the dispersed processing performed by a plurality of devices or a plurality of systems.

The control according to the embodiment of the present disclosure can be executed by a typical computer system without resort to a dedicated system. For example, a control unit can be configured by installing a program on a general-purpose computer from a recording medium storing the program for performing the aforementioned processes, e.g., a FD (Flexible disk) or a CD-ROM (Compact Disc Read Only Memory).

An arbitrary means can be used to provide the program. The program may be provided not only through a specified recording medium as described above but also through, e.g., a communication line, a communication network or a communication system. In this case, for example, the program may be posted on a BBS (Bulletin Board System) of a communication network and may be provided through a network. The aforementioned processes can be performed by booting up the program thus provided and executing the program under the control of an OS just like other application programs.

The present disclosure is suitable for use in a group management system that includes one or more manufacturing devices configured to perform a specified semiconductor process with respect to a workpiece, one or more server devices connected to the manufacturing devices and one or more client devices connected to the server devices.

According to the present disclosure, it is possible to shorten a downtime of a manufacturing device. Furthermore, according to the present disclosure, it is possible to make a user's work efficient.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A group management system, comprising:
one or more semiconductor manufacturing devices configured to perform a specified process with respect to a workpiece; and
one or more server devices connected to the one or more semiconductor manufacturing devices,
wherein each of the one or more semiconductor manufacturing devices includes:
a manufacturing device display unit configured to display information on the specified process;
an acquiring unit configured to acquire information including temperatures, pressures, flow rates and electric powers of respective parts of each of the one or more semiconductor manufacturing devices; and
an acquired information transmitting unit configured to transmit the information acquired by the acquiring unit to the server devices, and wherein each of the server devices includes:
a storage unit configured to store the information transmitted from the acquired information transmitting unit;
an analysis unit configured to analyze the information stored in the storage unit; and
a server device display unit configured to display the information stored in the storage unit and information analyzed in the analysis unit,
each of the one or more semiconductor manufacturing devices further including a remote operation function unit configured to directly operate the server device display unit from the manufacturing device display unit,
wherein the remote operation function unit is configured to operate all display screens displayed on the server device display unit from the manufacturing device display unit of each of the one or more semiconductor manufacturing devices.

2. The system of claim 1, wherein the remote operation function unit includes:
a data request information producing unit configured to produce data request information that requests transmission of data relating to the information stored in the storage unit; and
a data request information transmitting unit configured to transmit the produced data request information to the server devices,
wherein each of the server devices further includes a display screen information generating unit configured to generate information to be displayed on a display screen based on the data request information, and a display screen information transmitting unit configured to transmit the generated information to be displayed on the display screen to the manufacturing devices.

3. The system of claim 1, wherein each of the server devices is configured to store process-related information including recipes and processing parameters, which are used in the manufacturing devices.

4. The system of claim 1, further comprising:
one or more client devices connected to the server devices.

5. A non-transitory computer-readable recording medium storing a program that cause a computer to perform a process for serving as a group management system comprising one or more semiconductor manufacturing devices configured to perform a specified process with respect to a workpiece and one or more server devices connected to the one or more semiconductor manufacturing devices,
the program configured to enable the computer to cause each of the one or more semiconductor manufacturing devices to serve as a manufacturing device display unit configured to display information on the specified process, an acquiring unit configured to acquire information including temperatures, pressures, flow rates and electric powers of respective parts of each of the one or more semiconductor manufacturing devices, and an acquired information transmitting unit configured to transmit the information acquired by the acquiring unit to the server devices,
the program configured to enable the computer to cause each of the server devices to serve as a storage unit configured to store the information transmitted from the acquired information transmitting unit, an analysis unit configured to analyze the information stored in the storage unit, and a server device display unit configured to display the information stored in the storage unit and the information analyzed in the analysis unit, and the program configured to enable the computer to cause each of the one or more semiconductor manufacturing devices to serve as a remote operation function unit configured to directly operate the server device display unit from the manufacturing device display unit, wherein the remote operation function unit is configured to operate all display screens displayed on the server device display unit from the manufacturing device display unit of each of the one or more semiconductor manufacturing devices.

* * * * *